(12) United States Patent
Dixon

(10) Patent No.: US 7,730,978 B2
(45) Date of Patent: Jun. 8, 2010

(54) ALL-TERRAIN ROBOTIC OMNI-DIRECTIONAL DRIVE ASSEMBLY

(76) Inventor: Donald Dixon, Kangseo-Gu Whagok-4 Dong, 504-70, No. 402 Seoul (KR)

( * ) Notice: Subject to any disclaimer, the term of this patent is extended or adjusted under 35 U.S.C. 154(b) by 254 days.

(21) Appl. No.: 11/772,605

(22) Filed: Jul. 2, 2007

(65) Prior Publication Data

US 2008/0156547 A1     Jul. 3, 2008

Related U.S. Application Data

(60) Provisional application No. 60/806,373, filed on Jun. 30, 2006.

(51) Int. Cl.
*B62D 57/00* (2006.01)
(52) U.S. Cl. .................. 180/7.1; 301/5.23
(58) Field of Classification Search ............. 180/7.1, 180/7.2; 301/5.23
See application file for complete search history.

(56) References Cited

U.S. PATENT DOCUMENTS

| | | | | |
|---|---|---|---|---|
| 1,905,345 A | * | 4/1933 | Dandini | 440/100 |
| 4,366,936 A | * | 1/1983 | Ferguson | 244/2 |
| 5,374,879 A | * | 12/1994 | Pin et al. | 318/139 |
| 6,796,618 B2 | * | 9/2004 | Harris | 301/5.1 |
| 7,013,200 B2 | * | 3/2006 | Wakui | 700/245 |
| 7,056,185 B1 | * | 6/2006 | Anagnostou | 446/456 |

* cited by examiner

*Primary Examiner*—Kevin Hurley
(74) *Attorney, Agent, or Firm*—Thomas E. Donohue; Dickinson Wright PLLC

(57) ABSTRACT

A main ellipsoidal drive element is provided including a buoyant internal chamber. The main ellipsoidal drive element defines a main ellipsoid axis, a minor ellipsoid plane, a first ellipsoid end portion, a second ellipsoid end portion, and an outer ellipsoid surface. A drive engagement element is mounted to the first ellipsoid end portion and selectively transfers rotational drive to the main ellipsoidal drive element around the main ellipsoid axis. A plurality of roller elements are mounted around a minor ellipsoid periphery of the main ellipsoidal element. Each of the roller elements are orientated to provide friction reduced rolling in a main ellipsoid axis direction and traction perpendicular to the main ellipsoid axis direction.

19 Claims, 5 Drawing Sheets

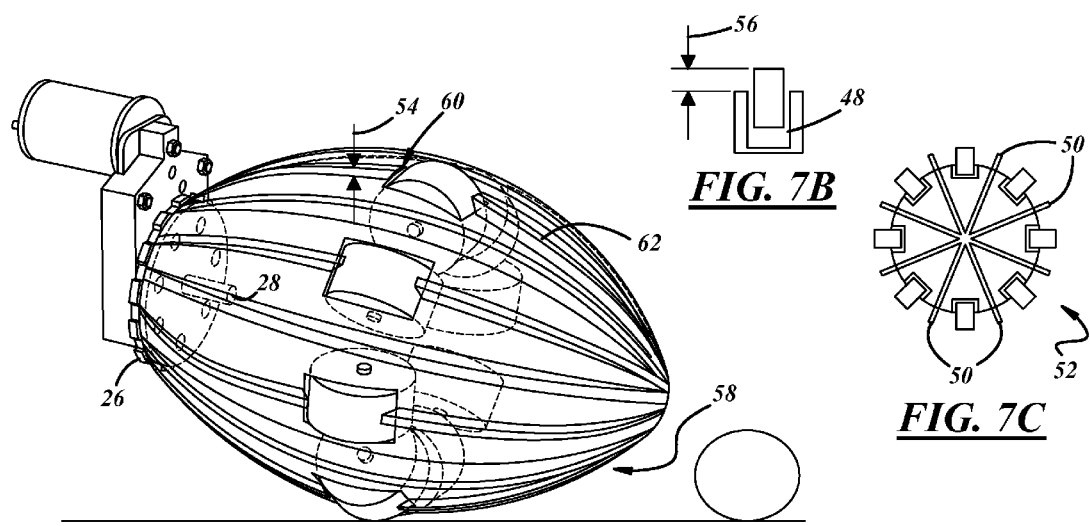
FIG. 7A
FIG. 7B
FIG. 7C
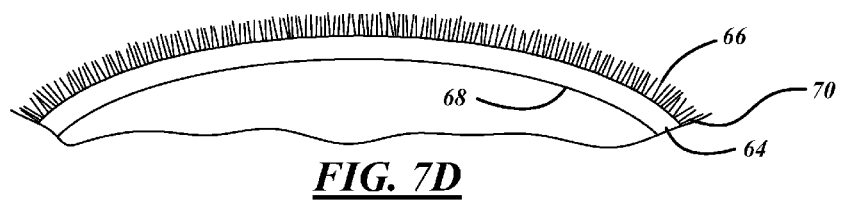
FIG. 7D

ALL-TERRAIN ROBOTIC OMNI-DIRECTIONAL DRIVE ASSEMBLY

TECHNICAL FIELD

The present invention relates generally to a robotic omni-directional drive assembly and more particularly to an all-terrain omni-wheel drive assembly with versatile operating environment capabilities.

BACKGROUND OF THE INVENTION

Robotic drive assemblies are often sensitive to the differing terrains on which they are required to traverse. As a result, drive assemblies are often designed to accommodate only narrow environmental scenarios. The resultant robotic drive assemblies are, therefore, commonly designed to be narrowly configured for highly specific operating environments. Operation outside such narrow parameters can result in drive failure or incapacitation of the robotic assembly.

A common approach to all-terrain operation has been through the development of highly complex mechanical drive assemblies suitable for multi-environmental operation. However, the complexity of such drive assemblies exposes these drives to mechanical failure or undesirable maintenance requirements. In addition, complexity also drives production costs and assembly weight. This can serve to limit the suitable applications for which the drive assembly may be utilized.

A robotic drive assembly with reduced complexity and the ability to cope with a vast diversity of operation environments would reduce manufacturing costs and provide an increased range of application and operation. In addition, maintenance costs and schedules could be significantly reduced. These benefits would serve a host of applications ranging from entertainment to aerospace.

SUMMARY OF THE INVENTION

In accordance with the objects of the present invention a main ellipsoidal drive element is provided including a buoyant internal chamber. The main ellipsoidal drive element defines a main ellipsoid axis, a minor ellipsoid plane, a first ellipsoid end portion, a second ellipsoid end portion, and an outer ellipsoid surface. A drive engagement element is mounted to the first ellipsoid end portion and selectively transfers rotational drive to the main ellipsoidal drive element around the main ellipsoid axis. A plurality of roller elements are mounted around a minor ellipsoid periphery of the main ellipsoidal element. Each of the roller elements are orientated to provide friction reduced rolling in a main ellipsoid axis direction and traction perpendicular to the main ellipsoid axis direction.

Other objects and features of the present invention will become apparent when viewed in light of the detailed description and preferred embodiment when taken in conjunction with the attached drawings and claims.

BRIEF DESCRIPTION OF THE DRAWINGS

FIG. 7a is a detailed illustration of an embodiment of the main ellipsoid drive element, the main ellipsoid drive element incorporating a plurality of fin elements.

FIG. 7b is a detailed illustration of a portion of the main ellipsoid drive element illustrated in FIG. 7a, the detail illustrating a watertight well for mounting the rollers.

FIG. 7c is a cross-sectional illustration of the main ellipsoid drive element illustrated in FIG. 7a.

FIG. 7d is a detailed illustration of an embodiment of a fin element for use with the main ellipsoid drive element illustrated in FIG. 7a.

DESCRIPTION OF PREFERRED EMBODIMENTS

Figure 1:
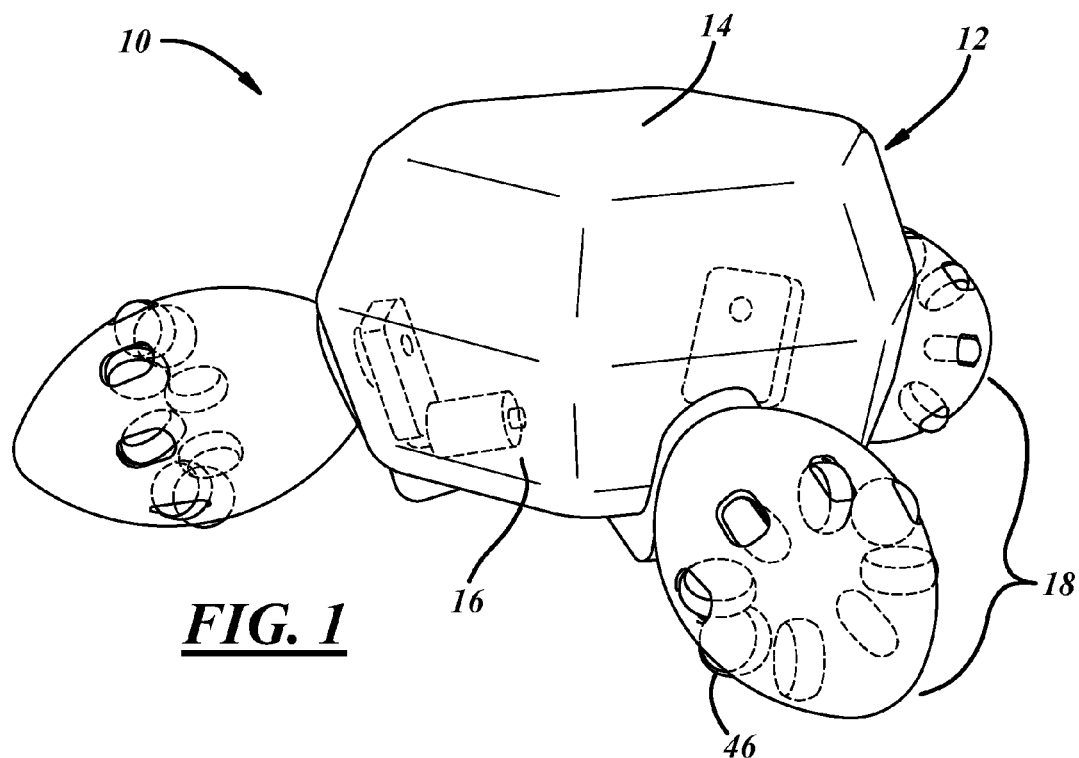
FIG. 1 is an illustration of an all terrain omni-directional drive assembly in accordance with the present invention.
Figure 2:
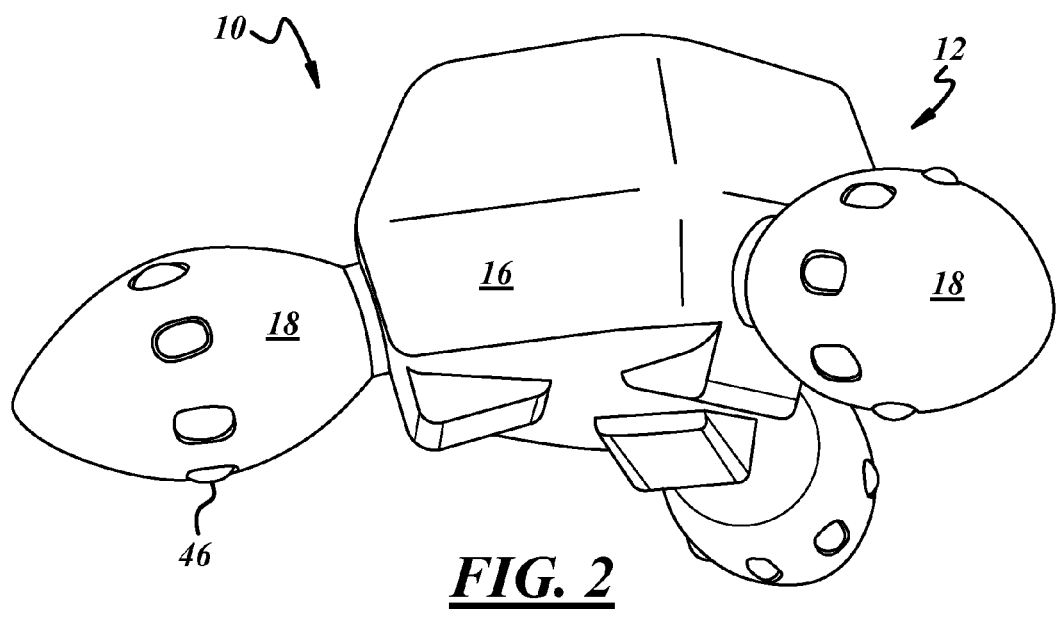
FIG. 2 is an alternate view illustration of the all terrain omni-directional drive assembly illustrated in FIG. 1.
Figure 3:
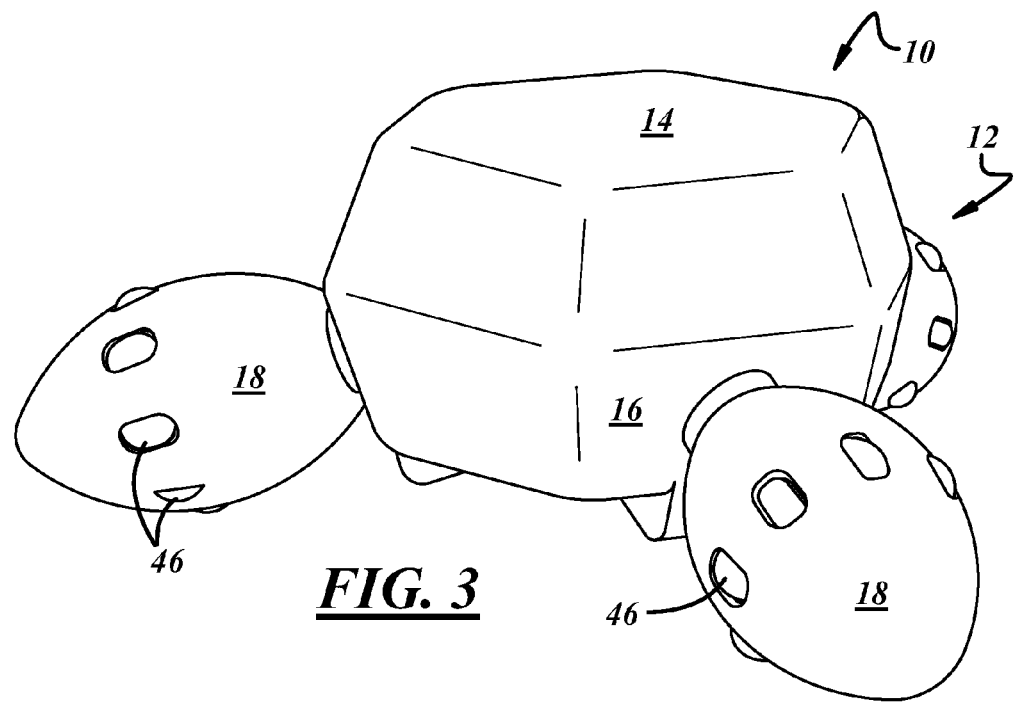
FIG. 3 is an alternate view illustration of the all terrain omni-directional drive assembly illustrated in FIG. 1.

Referring now to FIGS. 1-3, which are illustrations of an all-terrain omni-directional drive assembly 10 in accordance with the present invention. The all-terrain omni-directional drive assembly 10 is intended for a variety of applications. One contemplated embodiment is for utilization in robotic drive assemblies. The present drive assembly provides a versatile drive platform capable of traversing obstacles in addition to travel on both solid ground and water.

Figure 8:
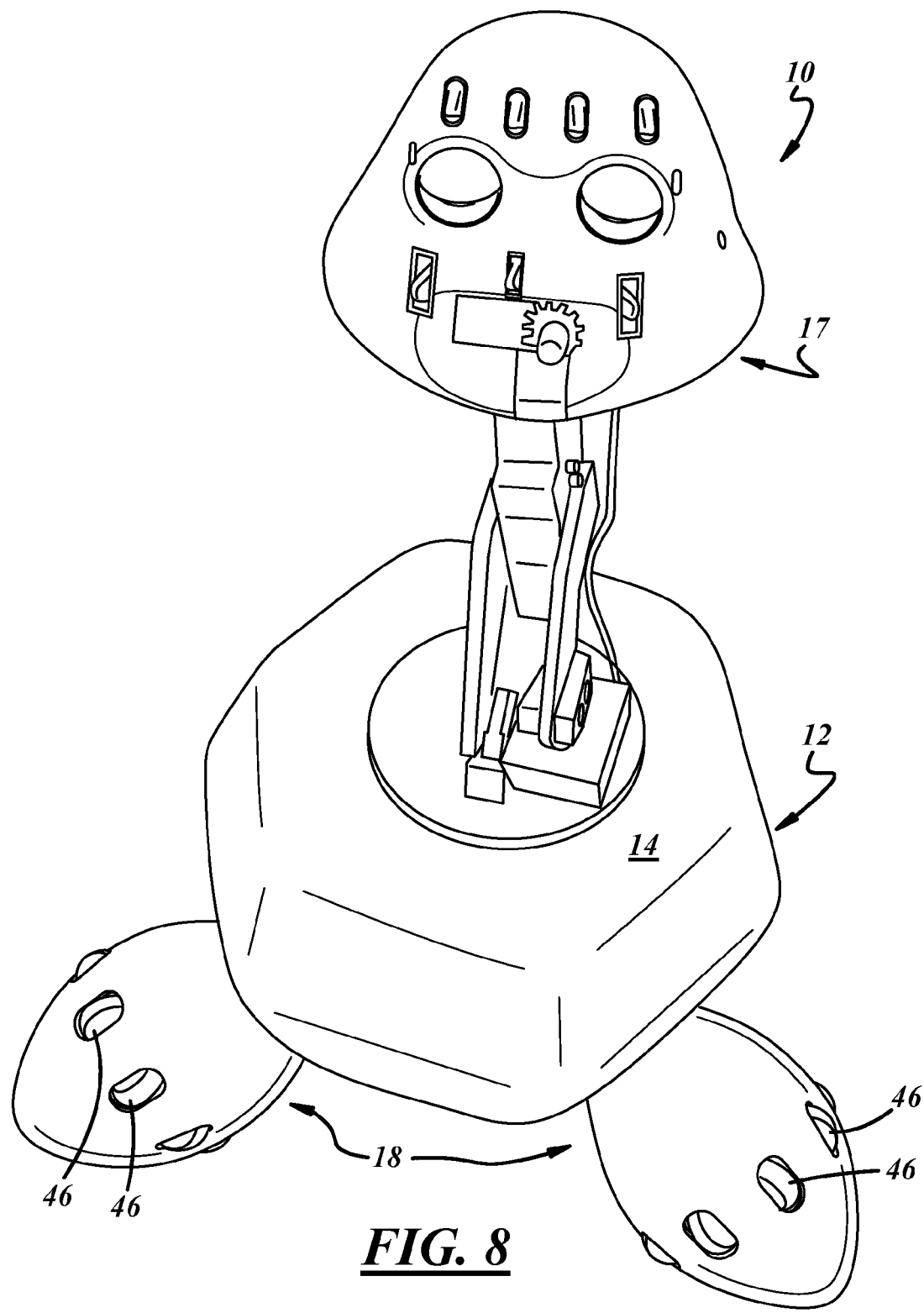
FIG. 8 is an illustration of an all terrain omni-directional drive assembly in accordance with the present invention, the illustration illustrating a robotic assembly mounted to the robotic drive platform.

The all-terrain omni-directional drive assembly 10 includes a robotic drive platform 12 including an upper platform surface 14 and a side platform periphery 16. A variety of applications and additional hardware may be mounted to the robotic platform 12 in order to accommodate a broad range of utilizations. FIG. 8 illustrates one embodiment contemplating usage as an entertainment robotic assembly. Although a humanoid shaped robot is depicted, it should be understood that a variety of robot assemblies 17 may be mounted to the robotic drive platform 12. These robotic assemblies 17 may include complex logic and mechanics for a variety of advanced functions and may be logically integrated into the robotic drive platform 12.

Figure 6:
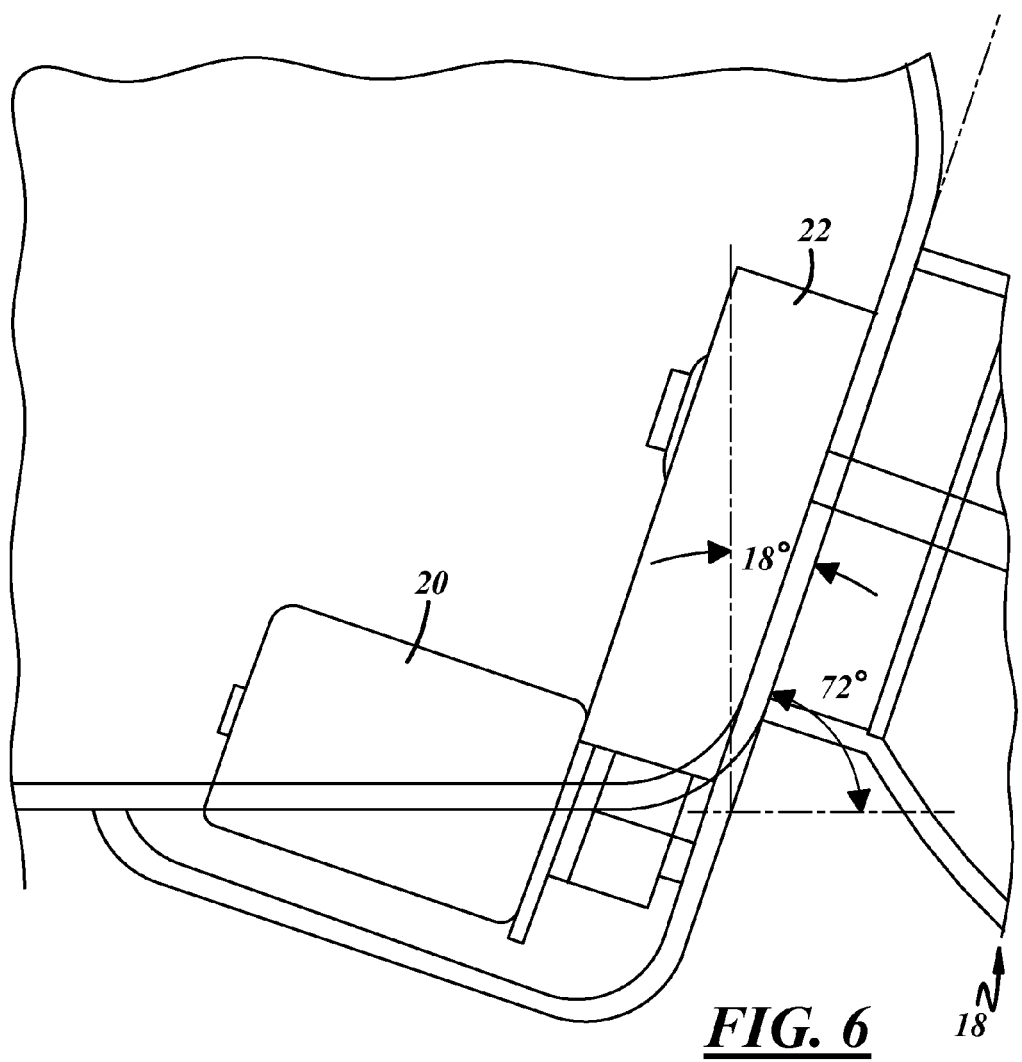
FIG. 6 is a detailed illustration of a portion of the omni-directional drive assembly illustrated in FIG. 1, the detail illustrating the mounting of the main ellipsoid drive element to the robotic drive platform.

The robotic drive platform 12 further includes a plurality of omni-wheel drive assemblies 18 mounted to the side platform periphery 16. Although any number may be utilized, at least one embodiment contemplates the use of three drive assemblies 18 mounted at a 120 degree spacing interval. In this fashion, two of the drive assemblies 18 may be selectively activated to produce forward or rearward movement while the third is dragged along with reduced friction as will be described below. The two activated drive assemblies are rotated toward each other to accomplish forward motion and away from each other to accomplish rearward motion. Rotation of the drive platform 12 may be accomplished by way of activating all three-drive assemblies 18 in the same direction. Although a variety of mounting configurations are contemplated, in one embodiment it is contemplated that the omni-wheel drive assemblies 18 are mounted to the platform periphery 16 at an approximate 72 degree angle (FIG. 6) to allow the omni-wheel drive assemblies 18 to engage terrain at an optimal angle.

Figure 4:
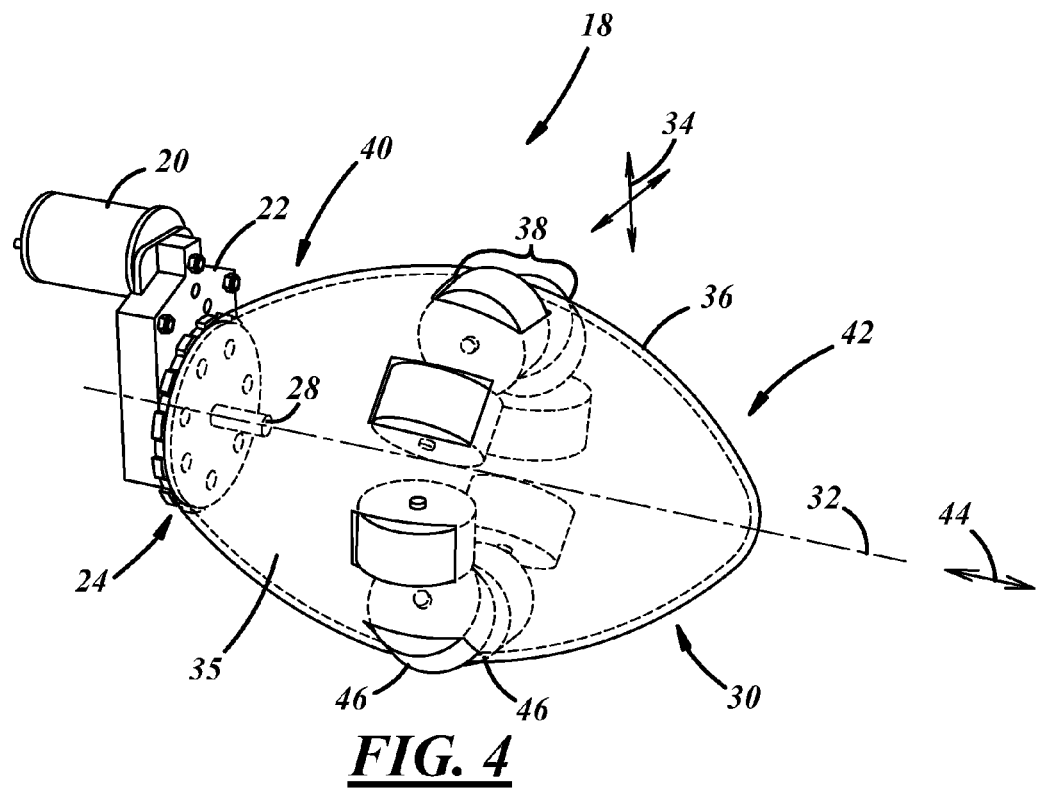
FIG. 4 is a detailed illustration of a main ellipsoid drive element as utilized in the omni-directional drive assembly illustrated in FIG. 1.
Figure 5:
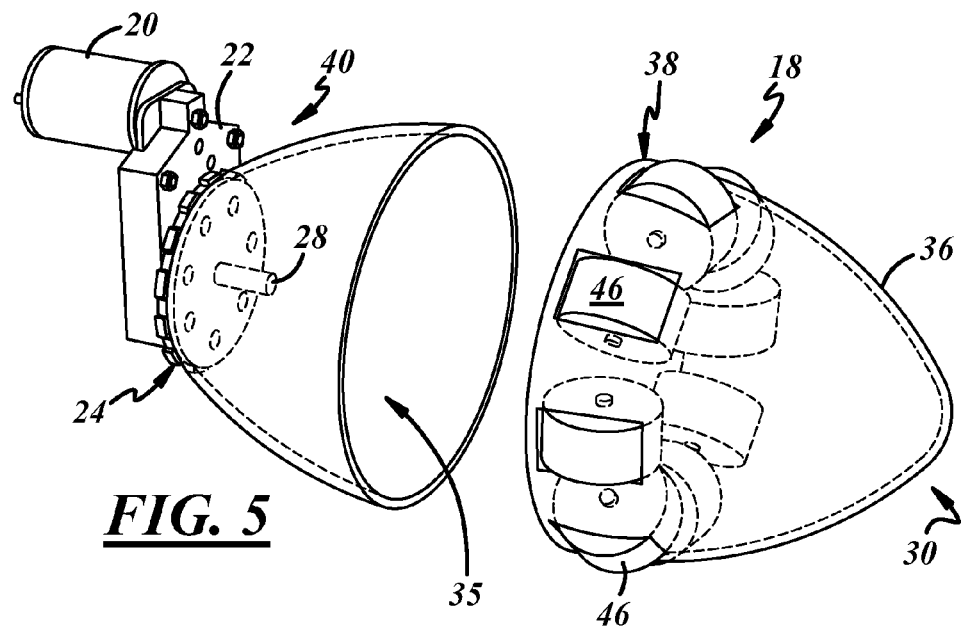
FIG. 5 is an exploded view illustration of the main ellipsoid drive element illustrated in FIG. 4.

Although rotation of the omni-wheel drive assemblies 18 may be accomplished in a variety of fashions, one embodiment contemplates the use of individual drive motors 20 associated with each drive assembly 18 (see FIG. 4). A drive transfer chamber 22 such as a gear chamber is mounted in communication with the drive motor 20 to transfer rotational drive to a drive engagement element 24. Although a variety of drive engagement elements 24 are contemplated, one embodiment contemplates the use of a drive wheel element 26 and an engagement pin 28 (see FIGS. 4 and 7). In light of the present specification, a wide variety of motorized configurations would be apparent.

The drive is transferred to a main ellipsoidal drive element 30, which forms the central element in the omni-wheel drive assembly 18 (see FIG. 4). The main ellipsoidal drive element 30 is responsible for converting the rotational drive provided by the drive motor 20 into actual forward/rearward movement of the robotic drive platform 12. An important aspect of the present invention is the ellipsoidal nature of the main ellipsoidal drive element 30. It should be understood that the term ellipsoidal need not be a pure geometric object but is intended to include a range of shapes including generally football-shaped forms and egg-shaped forms. Nevertheless, the general form may be defined as ellipsoidal. The main ellipsoidal drive element 30 therefore has a main ellipsoid axis 32 corresponding to the major axis of an ellipse. The main ellipsoid drive element 30 further includes a minor ellipsoid plane 34 corresponding to the minor axis of an ellipse. Where the minor ellipsoid plane 34 intersects the outer ellipsoid surface 36, a minor ellipsoid periphery 38 is generally defined. The main ellipsoidal drive element 30 further is defined by a first ellipsoid end portion 40 and a second ellipsoid end portion 42 corresponding to opposing ends of an ellipsoid along the main ellipsoid axis 32. The ellipsoidal configuration of the main drive element 30 allows it to easily be dragged over obstacles without getting hung up. The main ellipsoidal drive element 30 preferably includes a buoyant internal chamber 35 to allow transportation over fluid surfaces. Although this may be accomplished by forming the drive element 30 as a hollow shell, other buoyancy modifications are also contemplated.

Rotational drive is transferred about the main ellipsoid axis 32. As described above, every drive element 30 must be capable of producing rotational drive, but must additionally at times be dragged during non-operation. Therefore each drive element 30 must preferably have traction when rotated about the main ellipsoid axis 32 and relatively low frictional resistance when dragged in a main ellipsoid axis direction 44. The present invention accomplishes this through the use of a plurality of rollers 46 such as floating wheels. These rollers 46 are orientated parallel to the main ellipsoid axis 32 such that they provide traction when the main ellipsoid drive element 30 is rotated about the main ellipsoid axis 32 and reduced friction rolling when dragged in the main ellipsoid axis direction 44. Each of the rollers 46 is preferably mounted within the main ellipsoid drive element 30 such that only a portion of each roller 46 protrudes from the outer ellipsoid surface 36. In one embodiment, it is contemplated that each roller is mounted within a watertight well 48 so as to preserve the buoyancy of the main ellipsoid drive element 30. It should be understood, that while floating wheels have been described and illustrated, it is contemplated that the rollers 46 may additionally include a variety of reduced friction components including but not limited to cylindrical and spherical bearings.

A secondary aspect of the present invention is its ability to function on water or other fluids in addition or in place of terrestrial navigation. The buoyant internal chamber 35 can be utilized to provide the necessary floatation for marine navigation. The present invention, however, further contemplates the use of a plurality of fin elements 50 mounted on or formed on the outer ellipsoid surface 36 (see FIGS. 7*a*-7*d*). The fin elements 50 are preferably orientated parallel to the main ellipsoid axis 32 so as to provide paddle drive when the main ellipsoid drive element 34 is rotated. In sand and snow environments, the fin elements 50 additionally provide paddle drive. When the fin elements 50 are utilized in conjunction with the rollers 46 the present assembly 10 may traverse back and forth between land and sea. Although the combination of rollers 46 and fins 50 is preferred, it should be understood that the present invention may utilize either separately as well. The fin elements 50 may include a first fin group 52 positioned between each of the rollers 46 and having a fin height 54 preferably equal to or less than the roller protrusion height 56. In at least one embodiment, each of the first fin group 52 extends over a majority of the main ellipsoid axis 32. The present invention may further include a second fin group 58 (or utilized in lieu of the first group 52) positioned coincident with each of the rollers 46. For this group of fins 58, it is contemplated that each fin 50 is comprised of a first fin portion 60 running from the first ellipsoid end portion 40 to a roller 46 and a second fin portion 62 running from the roller 46 towards the second ellipsoid end portion 42.

In an additional embodiment illustrated in FIG. 7*d*, it is contemplated that each fin element 50 includes a solid fin portion 64 and a brush portion 66. The solid fin portion includes a first solid end 68 in contact with the outer ellipsoid surface 36 and a second solid end 70 extending away therefrom. The brush portion 66 is positioned on the second solid end 70. The brush portion 66 provides reduced friction drag while assisting in both mechanical drive on terrestrial surfaces and paddle drive on marine surfaces. It is even contemplated that the entire fin element 50 may be formed from a brush portion 66. A wide variety of brush depths 72 are contemplated including, but not limited to, eighth inch depths to two inch depths. Brush density is contemplated to be similar to a toothbrush, although a variety of brush densities may be utilized based on application criteria. The use of brush portions 66 in addition may allow for drive over ice surfaces wherein roller elements 46 alone may prove insufficient.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An all-terrain drive assembly comprising:

a robotic drive platform including an upper platform surface and a side platform periphery;

a drive motor;

a first drive engagement element;

a drive transfer chamber in communication with said drive motor and said drive engagement element, said drive transfer chamber transferring drive from said drive motor to said drive engagement element;

at least one omni-wheel drive assembly mounted to said side periphery, each of said omni-wheel drive assembly comprising:

a main ellipsoidal drive element defining a main ellipsoid axis, a minor ellipsoid plane, a first ellipsoid end portion, a second ellipsoid end portion, and an outer ellipsoid surface, said drive engagement element mounted to said first ellipsoid end portion and selectively transferring rotational drive to said main ellipsoidal drive element around said main ellipsoid axis;

a plurality of roller elements mounted around a minor ellipsoid periphery of said main ellipsoidal element, each of said roller elements orientated to provide friction reduced rolling in a main ellipsoid axis direction and traction perpendicular to said main ellipsoid axis direction.

2. An all-terrain drive assembly as described in claim 1, further comprising:
a plurality of fin elements positioned on said outer ellipsoid surface, each of said fin elements orientated parallel to said main ellipsoid axis.

3. An all-terrain drive assembly as described in claim 2, wherein each of said fin elements comprises:
a solid fin portion having a first solid end in direct communication with said outer ellipsoid surface and a second solid end positioned remotely from said outer ellipsoid surface; and
a brush portion extending radially outwards from said second solid end.

4. An all-terrain drive assembly as described in claim 2, wherein said plurality of fin elements comprises:
a first fin group positioned between each of said plurality of roller elements.

5. An all-terrain drive assembly as described in claim 4, wherein said plurality of fin elements further comprises:
a second fin group positioned coincident with said plurality of roller elements, each of said second fin group comprising:
a first fin portion extending from said first ellipsoidal end portion to said roller element; and
a second fin portion extending from said roller element to said second ellipsoidal end portion.

6. An all-terrain drive assembly as described in claim 1, wherein each of said plurality of roller elements is positioned within a watertight well formed within said main ellipsoidal drive element such that only a portion of each of said roller elements protrudes from said outer ellipsoidal surface.

7. An all-terrain drive assembly as described in claim 1, wherein said plurality of roller elements comprises a plurality of floating wheels.

8. An all-terrain drive assembly as described in claim 1, wherein drive transfer chamber comprises a gear chamber.

9. An all-terrain drive assembly as described in claim 1, wherein drive engagement element comprises:
a drive wheel element; and
an engagement pin.

10. An all-terrain drive assembly as described in claim 1, wherein first ellipsoidal end portion is mounted to said drive engagement element such that said first ellipsoidal end portion is elevated relative to said second ellipsoidal end portion.

11. An all-terrain drive assembly as described in claim 10, wherein main ellipsoidal drive element is mounted to said side periphery on approximately a 72 degree angle.

12. An all-terrain drive assembly as described in claim 1, wherein said main ellipsoidal drive element comprises a buoyant internal chamber.

13. An all-terrain drive assembly comprising:
a robotic drive platform including an upper platform surface and a side platform periphery;
a plurality of omni-wheel drive assemblies mounted to said side periphery, each of said omni-wheel drive assemblies comprising:

a main ellipsoidal drive element defining a main ellipsoid axis, a minor ellipsoid plane, a first ellipsoid end portion, a second ellipsoid end portion, and an outer ellipsoid surface;
a plurality of fin elements positioned on said outer ellipsoid surface, each of said fin elements orientated parallel to said main ellipsoid axis.

14. An all-terrain drive assembly as described in claim 13, wherein each of said fin elements comprises:
a solid fin portion having a first solid end in direct communication with said outer ellipsoid surface and a second solid end positioned remotely from said outer ellipsoid surface; and
a brush portion extending radially outwards from said second solid end.

15. An all-terrain drive assembly as described in claim 13, wherein each of said fin elements comprises a brush portion.

16. An all-terrain drive assembly as described in claim 13, further comprising:
a drive motor:
a first drive engagement element; and
a drive transfer chamber in communication with said drive motor and said drive engagement element, said drive transfer chamber transferring drive from said drive motor to said drive engagement element;
wherein said drive engagement element is mounted to said first ellipsoid end portion and selectively transfers rotational drive to said main ellipsoidal drive element around said main ellipsoid axis.

17. An all-terrain drive assembly comprising:
a robotic drive platform including an upper platform surface and a side platform periphery;
three omni-wheel drive assemblies mounted to said side platform periphery and positioned at 120 degree intervals, each of said three omni-wheel drive assemblies selectively activated, each of said omni-wheel drive assemblies comprising:
a drive motor;
a first drive engagement element;
a drive transfer chamber in communication with said drive motor and said drive engagement element, said drive transfer chamber transferring drive from said drive motor to said drive engagement element;
a main ellipsoidal drive element defining a main ellipsoid axis, a minor ellipsoid plane, a first ellipsoid end portion, a second ellipsoid end portion, and an outer ellipsoid surface, said drive engagement element mounted to said first ellipsoid end portion and selectively transferring rotational drive to said main ellipsoidal drive element around said main ellipsoid axis; and
a plurality of roller elements mounted around a minor ellipsoid periphery of said main ellipsoidal element, each of said roller elements orientated to provide friction reduced rolling in a main ellipsoid axis direction and traction perpendicular to said main ellipsoid axis direction.

18. An omni-wheel drive assembly comprising:
a main ellipsoidal drive element defining a main ellipsoid axis, a minor ellipsoid plane, a first ellipsoid end portion, a second ellipsoid end portion, and an outer ellipsoid surface, said main ellipsoidal drive element providing rotational drive around said main ellipsoid axis; and
a plurality of roller elements mounted around a minor ellipsoid periphery of said main ellipsoidal element, each of said roller elements orientated to provide friction reduced rolling in a main ellipsoid axis direction and traction perpendicular to said main ellipsoid axis direction.

19. An omni-wheel drive assembly comprising:

an oblong main ellipsoid drive element defining a main ellipsoid axis, a minor ellipsoid plane, a first ellipsoid end portion, a second ellipsoid end portion, and an outer ellipsoid surface, said main ellipsoidal drive element providing rotational drive around said main ellipsoid axis; and a plurality of fin elements positioned on said outer ellipsoid surface, each of said fin elements orientated parallel to said main ellipsoid axis.

* * * * *